US012796651B2

(12) United States Patent
Kim et al.

(10) Patent No.: US 12,796,651 B2
(45) Date of Patent: Nov. 17, 2026

(54) PET WASTE COLLECTION DEVICE

(71) Applicant: Valiantx Co., Ltd., Bucheon-si (KR)

(72) Inventors: Tae Hyun Kim, Seoul (KR); Doo San Baek, Seoul (KR); Su Sang Park, Uiwang-si (KR); Jin Myung Joo, Seoul (KR)

(73) Assignee: VALIANTX CO., LTD., Bucheon-si (KR)

( * ) Notice: Subject to any disclaimer, the term of this patent is extended or adjusted under 35 U.S.C. 154(b) by 0 days.

(21) Appl. No.: 18/934,818

(22) Filed: Nov. 1, 2024

(65) Prior Publication Data

US 2026/0114420 A1 Apr. 30, 2026

(30) Foreign Application Priority Data

Oct. 30, 2024 (KR) ........................ 10-2024-0151586

(51) Int. Cl.
*A01K 1/01* (2006.01)

(52) U.S. Cl.
CPC .................................. *A01K 1/0114* (2013.01)

(58) Field of Classification Search
CPC .............................. A01K 1/011; A01K 1/0114
See application file for complete search history.

(56) References Cited

U.S. PATENT DOCUMENTS 5,048,465 A * 9/1991 Carlisi .................. A01K 1/011 119/161
5,226,388 A * 7/1993 McDaniel ............ A01K 1/0114 119/166
5,477,812 A * 12/1995 Waters ................. A01K 1/0114 119/166
6,082,302 A * 7/2000 Thaler .................. A01K 1/0114 119/161
6,205,954 B1 * 3/2001 Bogaerts .............. A01K 1/0114 119/166
6,851,386 B2 * 2/2005 Northrop ............. A01K 1/0114 119/165
7,762,213 B2 * 7/2010 Cook ................... A01K 1/0114 119/161
7,997,230 B2 * 8/2011 Cook ................... A01K 1/0114 119/166
8,109,237 B1 * 2/2012 Tsengas ............... A01K 1/0114 119/616

(Continued)

FOREIGN PATENT DOCUMENTS

KR 10-2438156 B1 8/2022

*Primary Examiner* — Michael H Wang
(74) *Attorney, Agent, or Firm* — Paratus Law Group, PLLC

(57) ABSTRACT

A pet waste collection device includes: a housing forming an internal space, and having at least one opening for entrance of a pet; a bowel movement box disposed at a lower portion of the internal space, and loaded with bowel movement sand; rails formed on inner surfaces of both facing side surfaces of the housing; a collection unit including a gear portion moving along the rail, and a scooper coupled to the gear portion, and scooping and transporting a waste mixed with the bowel movement sand of the bowel movement box, and rotating to be laid down toward a floor of the bowel movement box, and moved when returning to an initial position; and a collection box disposed in a rear space of the housing, and accommodating the waste.

5 Claims, 13 Drawing Sheets

(56) References Cited

U.S. PATENT DOCUMENTS

| | | | | |
|---|---|---|---|---|
| 8,109,238 | B2 * | 2/2012 | Casiana | A01K 1/011<br>119/161 |
| 8,381,687 | B2 * | 2/2013 | Tsengas | A01K 1/0114<br>119/166 |
| 9,526,226 | B2 * | 12/2016 | Plazarte | A01K 1/0114 |
| 12,127,529 | B2 * | 10/2024 | Anderson | A01K 1/011 |
| 2003/0217700 | A1 * | 11/2003 | Northrop | A01K 1/0114<br>119/166 |
| 2007/0056521 | A1 * | 3/2007 | Caputa | A01K 1/011<br>119/166 |
| 2014/0069343 | A1 * | 3/2014 | Loveday | A01K 1/0132<br>119/166 |
| 2021/0251182 | A1 * | 8/2021 | Anderson | A01K 1/011 |
| 2024/0196855 | A1 * | 6/2024 | Graves | A01K 1/011 |

* cited by examiner (a) (b)

PET WASTE COLLECTION DEVICE

CROSS-REFERENCE TO PRIOR APPLICATION

This application claims priority to Korean Patent Application No. 10-2024-0151586 (filed on Oct. 30, 2024), which is all hereby incorporated by reference in their entirety.

BACKGROUND

The present disclosure relates to a pet waste collection device, and more particularly, to a pet waste collection device which has a bowel movement space for a pet, and can scoop and discharge waste while moving along a rail when the waste is generated, and prevent sand in the bowel movement space from being accumulated at an initial position when returning to the initial position.

In general, cats have a habit of digging into sand, defecating, and covering the defecation with sand. As a result, most people who raise cats at home will provide a so-called cat toilet in a form in which sand is loaded in a box with an open top.

A user pours out most of the cat's waste accumulated in the cat toilet together with the sand by using a tool such as a shovel and filters out the waste and the sand with a net body configured as a separate body, or pours out the sand together with the waste and removes remaining waste by using a shovel embedded with the net body through which the sand escapes.

Such a process has a problem in that it is inconvenient and takes a lot of time for users to find the waste. In addition, the odor of the cat's waste becomes terrible over time, and it is very unpleasant when the user directly removes the waste with the shovel.

In addition, in a process of finding the waste, various hygiene problems may occur, such as the user's hands coming into contact with the sand contaminated in the waste, the sand and dust being blown into the air, and the bacteria entering the respiratory tract.

Related Art: Korean Patent Registration No. 10-2438156 (Aug. 25, 2022)

SUMMARY

In view of the above, an embodiment of the present disclosure provides a pet waste collection device which has a bowel movement space of a pet, and can scoop and discharge waste while moving along a rail when the waste is generated, and prevent sand in the bowel movement space from being accumulated at an initial position when returning to the initial position.

An embodiment of the present disclosure is a pet waste collection device which allows a rake plate to be laid down towards a floor by a hinge when a scooper returns to prevent sand from being dragged.

Among embodiments, a pet waste collection device includes: a housing forming an internal space, and having at least one opening for entrance of a pet; a bowel movement box disposed at a lower portion of the internal space, and loaded with bowel movement sand; rails formed on inner surfaces of both facing side surfaces of the housing; a collection unit including a gear portion moving along the rail and a scooper coupled to the gear portion, scooping and transporting waste mixed with the bowel movement sand of the bowel movement box, rotating to be laid down toward a floor of the bowel movement box, and moved when returning to an initial position; and a collection box disposed in a rear space of the housing, and accommodating the waste.

The rail may include a first linear portion forming a length, in which a first curvature portion which extends from the first linear portion, and forming a first curvature upwards in the internal space, a second linear portion which extends from the first curvature portion, in which a second curvature portion which extends from the second linear portion, and forming a second curvature larger than the first curvature rearward in the interval space, and may guide a movement path so that the scooper moves by scooping the waste loaded on the bowel movement box.

The scooper may include a body and a rake portion disposed below the body, and may be configured by a rake plate including a plurality of scoop-shaped rakes, a coupling portion coupling the body and the rake portion, and at least one hinge member connecting the rake portion and the coupling portion.

The rake portion may include a step portion having one end rotatably connected to the coupling portion through the hinge member, and having steps formed at both corners of the other end.

The rake portion may include tilting control members which are spaced apart from each other by a specific distance and protrude at the one end and which hinge-rotate the rake portion by contacting a top of the collection box to control a slope in a direction of the collection box.

The coupling portion may include a coupling bar forming a length in direction to a second side surface from a first side surface of the housing, and coupled to one end of the rake portion through the hinge member, side frames formed at both ends of the coupling bar, and fixedly coupled to an upper portion of the body, and catching coupling portions which protrude on the side frames, and bent to face each other, and catching-coupled to the step portion when the rake portion hinge-rotates.

The side frame may include a slope portion, which protrudes and extends upward at both ends of the coupling bar, forming a slope, a bent extension portion, which is vertically bent and then horizontally bent upward from the slope portion, forming a length, and an end portion, which protrudes and extends upward from the bent extension portion, fixedly coupled to the upper portion of the body.

The scooper may maintain a scooping mode in which the rake portion hinge-rotates in a first direction around the coupling bar by gravity, and the step portion is catching-coupled to the catching coupling portion, upon a scooping operation at the initial position, and scoop the waste while horizontally moving toward the collection box from the initial position while the rake portion is erected at a specific angle with respect to the floor of the bowel movement box in the scooping mode.

The scooper may maintain a return mode in which the rake portion hinge-rotates in a second direction around the coupling bar by the gravity, and the step portion is catching-coupled between the slope portion and the bent extension portion by the gravity upon a return operation to the initial position, and return to the initial position while horizontally moving while the rake portion is laid down at a specific angle with respect to the floor of the bowel movement box along the slope portion in the return mode.

The scooper may perform a rearrangement task which flattens sand by dividing a section, and repeatedly performing forward movement and backward movement N (the N is a natural number) times through motor control of the gear portion for each section, while horizontally moving in the return mode.

The scooper may push and lift an end bent portion of a cover of the collection box to open the cover when transporting the waste, and move down while supporting the end bent portion of the cover to allow the cover to close the collection box.

The disclosed technology may have the following effects. However, since it is not meant that a specific embodiment should include all of the following effects or merely include the following effects, the scope of the disclosed technology is not to be construed as being limited thereby.

According to an embodiment of the present disclosure, a pet waste collection device has a bowel movement space of a pet, and can scoop and discharge waste while moving along a rail when the waste is generated, and prevent sand in the bowel movement space from being accumulated at an initial position when returning to the initial position.

According to an embodiment of the present disclosure, a pet waste collection device allows a rake plate to be laid down towards a floor by a hinge when a scooper returns to prevent sand from being dragged.

Accordingly, the present disclosure is easy to use and can maintain hygienic cleanliness because a user does not go through a waste removing process, and only empty waste collected in a collection box. Further, it is possible to ensure smooth access to pets by preventing the sand of a bowel movement box from being accumulated at an entrance.

DETAILED DESCRIPTION

Figure 1:
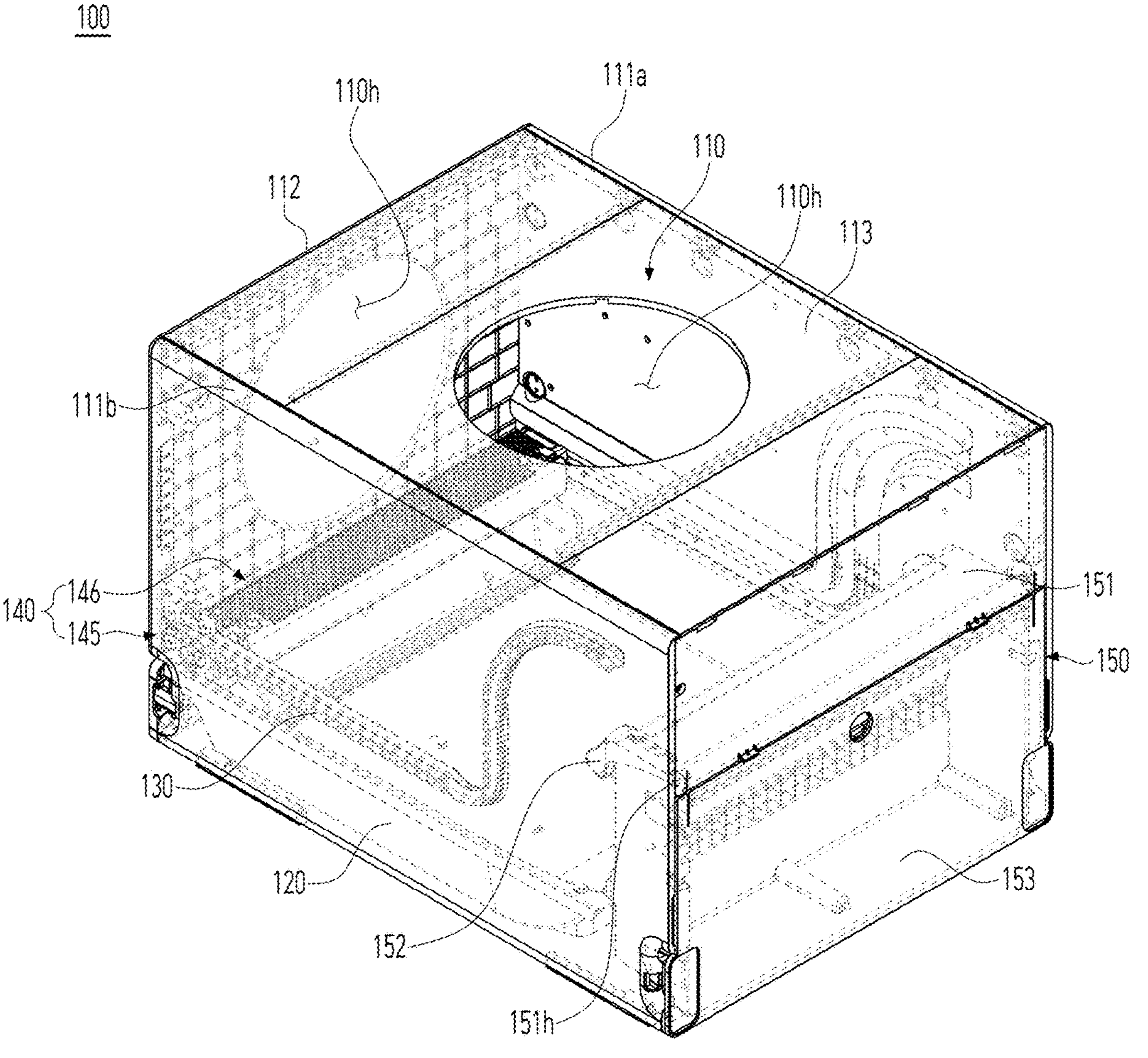
FIG. 1 is a perspective view illustrating a pet waste collection device according to an embodiment of the present disclosure.

A description of the present disclosure is merely an embodiment for a structural or functional description and the scope of the present disclosure should not be construed as being limited by an embodiments described in a text. That is, since the embodiment can be variously changed and have various forms, the scope of the present disclosure should be understood to include equivalents capable of realizing the technical spirit. Further, it should be understood that since a specific embodiment should include all objects or effects or include only the effect, the scope of the present disclosure is limited by the object or effect.

Meanwhile, meanings of terms described in the present application should be understood as follows.

The terms "first," "second,", and the like are used to differentiate a certain component from other components, but the scope should not be construed to be limited by the terms. For example, a first component may be referred to as a second component, and similarly, the second component may be referred to as the first component.

It should be understood that, when it is described that a component is "connected to" another component, the component may be directly connected to another component or a third component may be present therebetween. In contrast, it should be understood that, when it is described that an element is "directly connected to" another element, it is understood that no element is present between the element and another element. Meanwhile, other expressions describing the relationship of the components, that is, expressions such as "between" and "directly between" or "adjacent to" and "directly adjacent to" should be similarly interpreted.

It is to be understood that the singular expression encompasses a plurality of expressions unless the context clearly dictates otherwise and it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

In each step, reference numerals (e.g., a, b, c, etc.) are used for convenience of description, the reference numerals are not used to describe the order of the steps and, unless otherwise stated, it may occur differently from the order specified. That is, the respective steps may be performed similarly to the specified order, performed substantially simultaneously, and performed in an opposite order.

If it is not contrarily defined, all terms used herein have the same meanings as those generally understood by those skilled in the art. Terms which are defined in a generally used dictionary should be interpreted to have the same meaning as the meaning in the context of the related art, and are not interpreted as an ideal meaning or excessively formal meanings unless clearly defined in the present application.

The present disclosure relates to a waste collection device of a pet's toilet, in which a hinge-structure rake type scooper is designed, and the scooper scoops and removes waste, and then a rake plate may be laid down and moved when the scooper performs a return operation; a structure and an operation may be described with reference to FIGS. 1 to 13. Hereinafter, for understanding of description, it is described as an embodiment that the present disclosure is used as a cat's toilet. However, when sand is used in addition to a cat, the present disclosure is also available as toilets of other animals.

Figure 2:
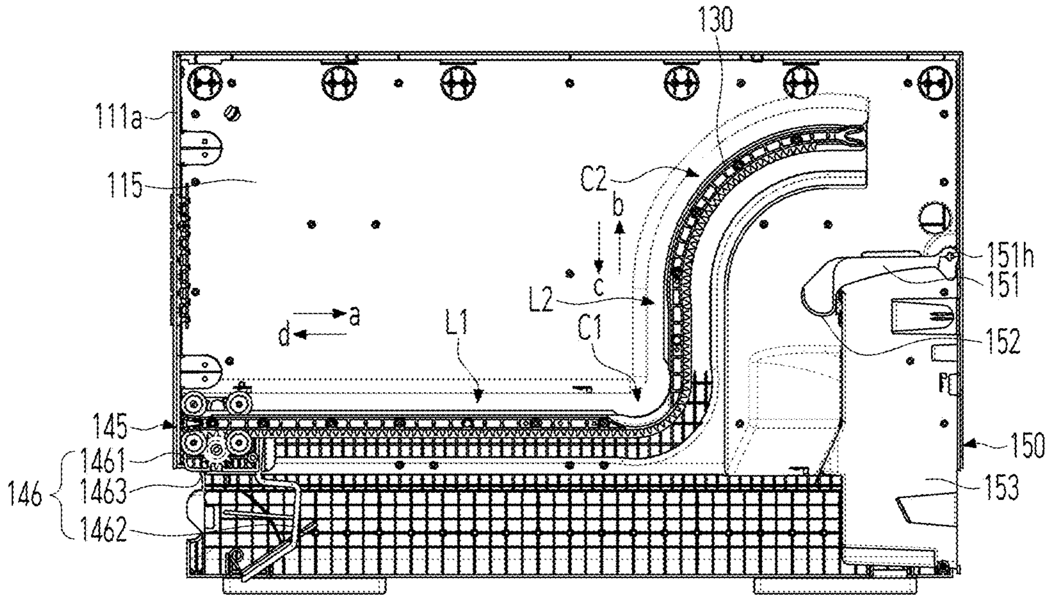
FIG. 2 is a side view illustrating the waste collection device of FIG. 1.
Figure 3:
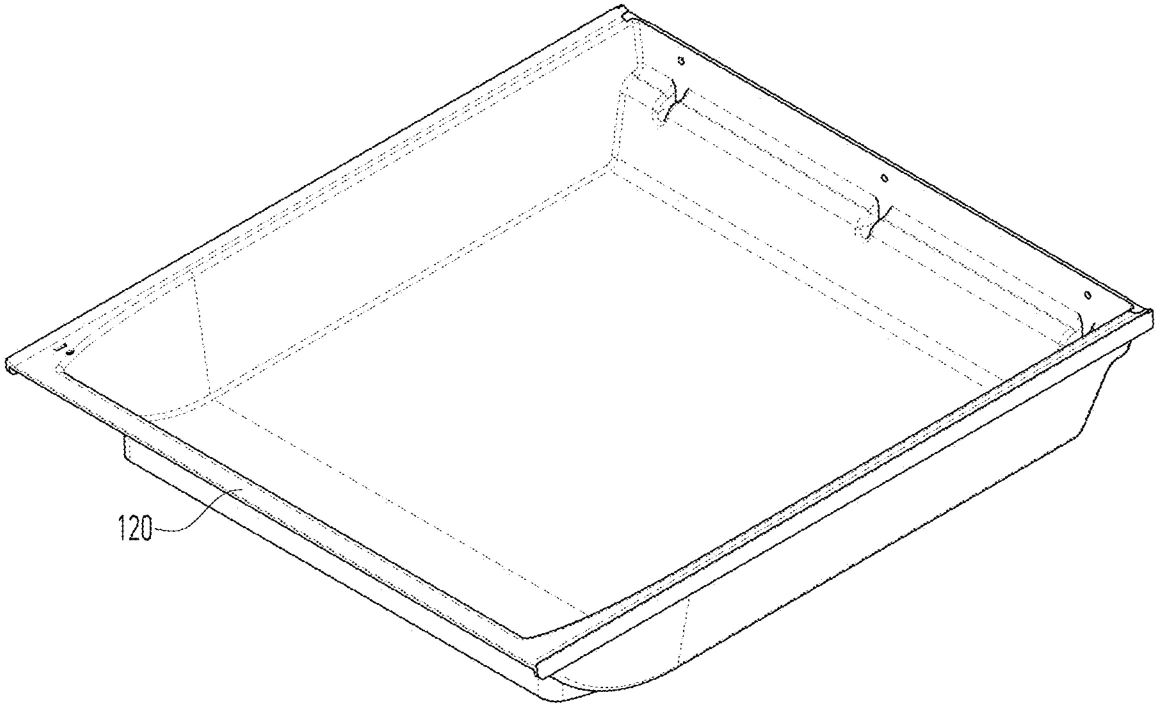
FIG. 3 is a perspective view illustrating a bowel movement box of FIG. 1.
Figure 4:
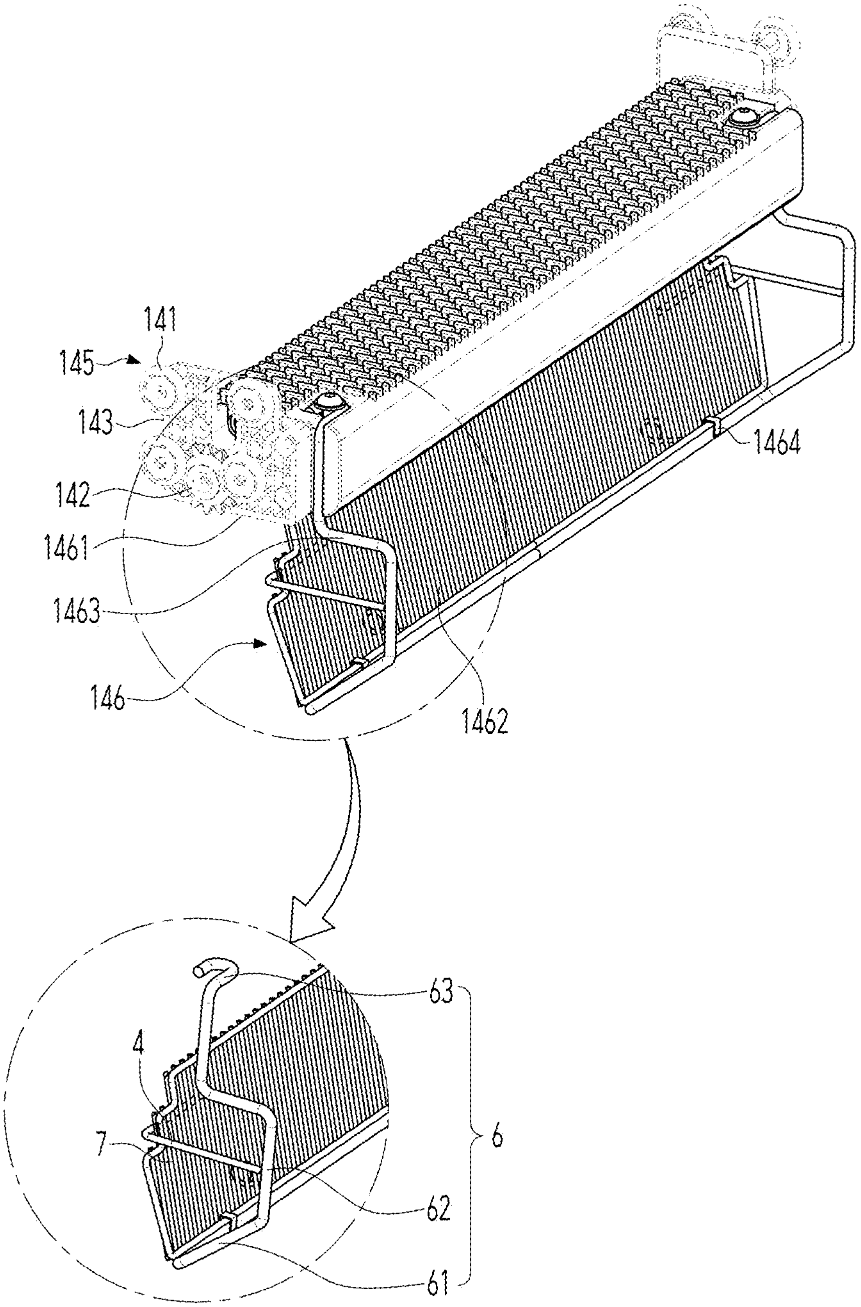
FIG. 4 is a diagram for describing a collection unit of FIG. 1.
Figure 5:
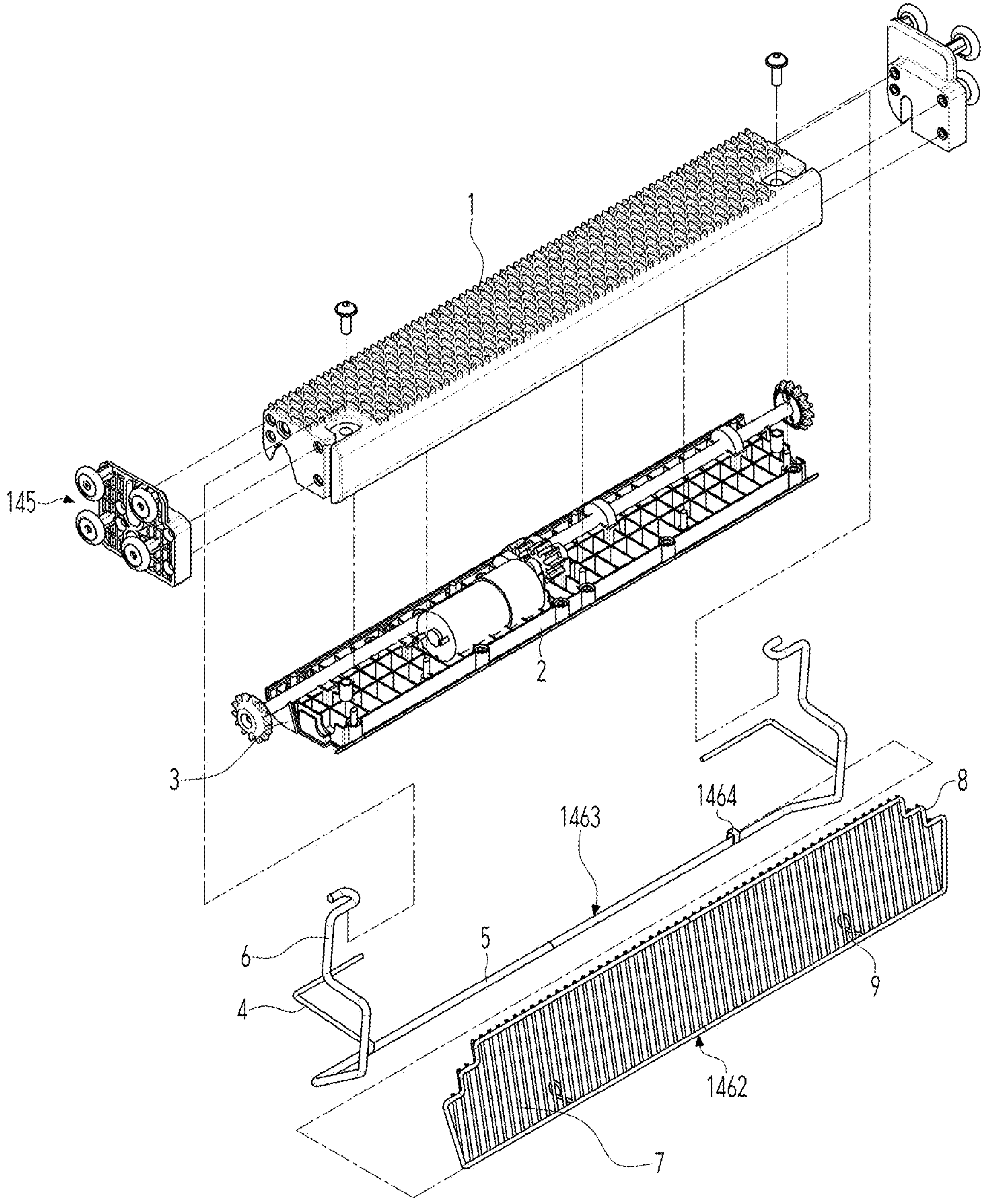
FIG. 5 is an exploded perspective view for describing a scooper of FIG. 4.

FIG. 1 is a perspective view illustrating a pet waste collection device according to an embodiment of the present disclosure, FIG. 2 is a side view illustrating the waste collection device of FIG. 1, FIG. 3 is a perspective view illustrating a bowel movement box of FIG. 1, FIG. 4 is a diagram for describing a collection unit of FIG. 1, and FIG. 5 is an exploded perspective view for describing a scooper of FIG. 4.

Referring to FIGS. 1 to 5, the waste collection device 100 as a toilet of a pet in which the pet may defecate may include a housing 110, a bowel movement box 120, a rail 130, a collection unit 140, and a collection box 150. The collection unit 140 may include a gear portion 145 and a scooper 146.

The housing 110 may include a first side surface 111*a*, a second side surface 111*b*, a front surface 112, and a top surface 113, and may form an internal space in which a cat may enter. At this time, the housing 110 may further include a bottom surface (not illustrated), and the bowel movement box 120 may also be disposed in a lower space of the housing 110 without the bottom surface. Here, the internal space may be formed by the housing 110, the bowel movement box 120 disposed in the lower space of the housing 110, and the collection box 150 disposed in a rear space of the housing 110. At this time, the housing 110 may be provided as a transparent plastic in which an interior is viewed, and may have at least one opening 110*h* for entrance of the cat.

The bowel movement box 120 may be provided at a lower portion of the internal space, and bowel movement sand may be loaded on the bowel movement box 120. The cat which enters the internal space through the opening 110*h* may defecate in the bowel movement box 120.

The housing 110 and the bowel movement box 120 have extensions to be configured in a sliding multi-stage structure, and when the cat grows and a size of the cat becomes large, the internal space may be expanded by sliding-extending the extensions of the housing 110 and the bowel movement box 120. At this time, when extending the housing 110 and the bowel movement box 120, extending the rail 130 is also required, and the rail 130 may be extended through insertion of an additional rail, etc.

The rail 130 may be formed on each of inner surfaces of both facing side surfaces 111*a* and 111*b* of the housing 110, and may guide a movement path so that the scooper 146 moves while scooping the waste of the cat loaded on the bowel movement box 120.

Referring to FIG. 2, the rail 130 may be formed by a first linear portion LA forming a length from a front and a rear of the internal space of the housing 110, in which a first curvature portion C1 forms a first curvature extended from the first linear portion L1, and forming a first curvature upwards in the inner space; a second linear portion L2 extended from the first curvature portion C1; and a second curvature portion C2 extended from the second linear portion L2, and forming a second curvature rearward in the internal space. At this time, the second curvature portion C2 may be extended up to the side surfaces 111*a* and 111*b* corresponding to a height of a top of a cover 151. Further, the first curvature of the first curvature portion C1 may be formed to be smaller than the curvature of the second curvature portion C2.

Further, a top and a bottom of the rail 130 are constituted by a plurality of lanes to provide a path on which each roller 141 of the gear portion 145 moves. At this time, the bottom of the rail 130 may be formed as a rack gear having sawteeth, and constituted by a plurality of lanes on which a lower roller may move.

The collection unit 140 may include the gear portion 145 which moves along the rail 130 formed on each of the first and second side surfaces 111*a* and 111*b*, and the scooper 146 connected to the gear portion 145, and scooping and transporting the waste mixed with the bowel movement sand of the bowel movement box 120.

Referring to FIG. 4, the gear portion 145 is coupled to the rail 130, and includes a plurality of rollers 141, a gear 142, and a gear box 143, and the respective rollers may move via different lanes. That is, the respective rollers may be bearing-connected to the gear box 143 with different lengths. At this time, the rollers may have the same diameter, and an upper roller may be hung on the rail 130 by gravity. In the embodiment of the present disclosure, a structure in which two rollers are coupled to each of the top and the bottom is described as an example, but the number of rollers may be changed, and the number of lanes of the rail 130 may also be changed according to the number of rollers.

The gear 142 may be formed as a pinion gear, and bearing-connected to a gear box 143 to be rotated by engaging with the rack gear on the bottom of the rail 130. At this time, the rail 130 and the gear portion 145 constitute a linear motor to be driven by a magnetic induction scheme. Alternatively, a general motor may be provided inside a scooper body 1461, and the scooper body 1461 may be connected to the pinion gear, and driven.

The collection unit 140 may have a curve recess portion in the first curvature portion C1 in which a motion direction of the gear portion 145 is changed so that the gear portion 145 may be moved along the rail 130 smoothly at a predetermined speed. A position and a depth of the curve recess portion may be determined based on a curvature circle according to the first curvature. At this time, the curve recess portion should be formed with a depth which does not influence the rack gear.

As an example, the rail may be constituted by a plurality of lanes, and when the rail 130 is constituted by two lanes for a case where there are two upper rollers 141, a first curve recess portion may be formed in the first curvature portion of a first lane and a second curve recess portion may be formed in the first curvature portion of a second lane. At this time, the first and second curve recess portions may guide a corresponding roller to be moved along a first curvature circle according to an inner curvature of the rack gear in the first curvature portion, and may be formed at different positions of the first curvature circle, and two upper rollers may move in the corresponding curvature recess portion at the same time.

A distance between centers of two upper rollers may be smaller than a diameter of the first curvature circle, and a distance between a center of an upper first roller and a center of the first curvature circle may be equal to a distance between a center of an upper second roller and the center of the first curvature circle. Further, when centers of the first curvature circle by an internal curvature of the rack gear, the second curvature circle by an external curvature of the rack gear, and a third curvature circle by a curvature corresponding to a movement path of a rake portion provided in the scooper are formed as one same center point, an internal curvature of the bowel movement box may be formed as an internal curvature of the third curvature circle or a value larger than the internal curvature of the third curvature circle by a predetermined value.

Through this, the gear portion 145 moves by a linear motion (a direction) in the first linear portion L1, and when moving on a path in which a direction (b direction) is changed by a vertical motion via the first curvature portion C1, the gear portion 145 may stably move at a predetermined speed. At this time, the upper roller which goes via the first curvature portion C1 moves at the same speed, while the gear 142 and the lower roller move along the external curvature of the rack gear, so drive speeds of the gear 142 and the lower roller are increased. Therefore, the gear portion 145 may stably move.

Specifically, the gear portion 145 may include a first gear portion coupled to the rail 130 of the first side surface 111*a*, and a second gear portion coupled to the rail 130 of the second side surface 111*b*, and the gear boxes 143 of two gear portions 145 may be coupled to both ends of the body 1461 of the scooper 146. At this time, the housing 110 may further include a frame 115 in a space not to interfere with movement of the scooper 146 between the gear box 143, and the body 1461 of the scooper 146 in order to prevent the cat from approaching the rail 130 and the gear portion 145, that is, in order to protect the rail 130 and the gear portion 145, and the frame 115 may also be provided in the structure extended upon sliding extending.

The scooper 146 forms a hinge rake structure to scoop the waste and discharge the waste to the collection box 150 while moving along the rail 130 when the waste is generated, and when the scooper 146 returns to an initial position, the rake portion 1462 rotates around the hinge and is laid down and moved toward a floor, thereby preventing the sand in the internal space from being accumulated at the initial position by the rake portion 1462 of the scooper 146.

Referring to FIG. 5, the scooper 146 may be configured to include the body 1461, the rake portion 1462, a coupling portion 1463, and a hinge member 1464.

The body 1461 may form a length in a direction from the first side surface 111*a* to the second side surface 111*b*, and both ends of the body 1461 may be coupled to both gear boxes 143 through screw coupling. At this time, the body 1461 may include an upper case 1, a lower case 2, and a side case 3.

The upper case 1 and the lower case 2 may be coupled to each other to form one body 1461, and may form a length in a direction from the first side surface 111*a* to the second side surface 111*b*, and may also include a motor therein. The side case 3 may be coupled to both sides of the lower case 2, and an upper portion of the side case 3 may be coupled to the gear box 143 of the gear portion 145.

The rake portion 1462 may be disposed below the body 1461, and configured by a rake plate including a plurality of scoop-shaped rakes 7. One end of the rake portion 1462 is rotatably connected to the coupling portion 1463 through the hinge member 1464. The rake portion 1462 includes a step portion 8 which forms steps at both corners of the other end, so the step portion 8 is caught on the coupling portion 1463 to limit a rotating range when the rake portion 1462 hinge-rotates. The rake portion 1462 includes a pair of scoop-shaped tilting control members which protrude while being spaced apart from each other by a specific distance at one end to control a slope so that the rake portion 1462 heads the collection box 150 by actuation of the tilting control member 9 according to a contact with the collection box 150 when the rake portion 1462 reaches a position of the collection box 150.

The coupling portion 1463 may couple the body 1461 and the rake portion 1462. To this end, the coupling portion 1463 may form a length in the direction from the first side surface 111*a* to the second side surface 111*b*, and include a coupling bar 5 coupled to the rake portion 1462 through the hinge member 1464, and side frames 6 formed at both ends of the coupling bar 5. The side frame 6 may include a slope portion 61, which protrudes and extends upwards at both ends of the coupling bar 5, forming the slope, a bent extension portion 62, vertically bent upward from the slope portion 61 and then horizontally bent, forming a length, and an end portion 63, which protrudes and extends upward from the bent extension portion 62, fixed coupled to the upper portion of the body 1461 through screw coupling. Here, an end of the end portion 63 may have a hook shape, a '⊏' shape, etc., and also be transformed to various shapes.

In addition, the coupling portion 1463 may include catching coupling portions 4 which reversely protrude and extend in a direction to the coupling bar 5 from respective bent extension portions 62 of the side frames 6 formed at both sides of the coupling bar 5, and bent in a '¬' shape to face each other, and catching-coupled to the step portions 8 when the rake portion 1462 hinge-rotates.

The hinge member 1464 may connect the coupling bar 5 and the rake portion 1462 to each other.

Figure 6:
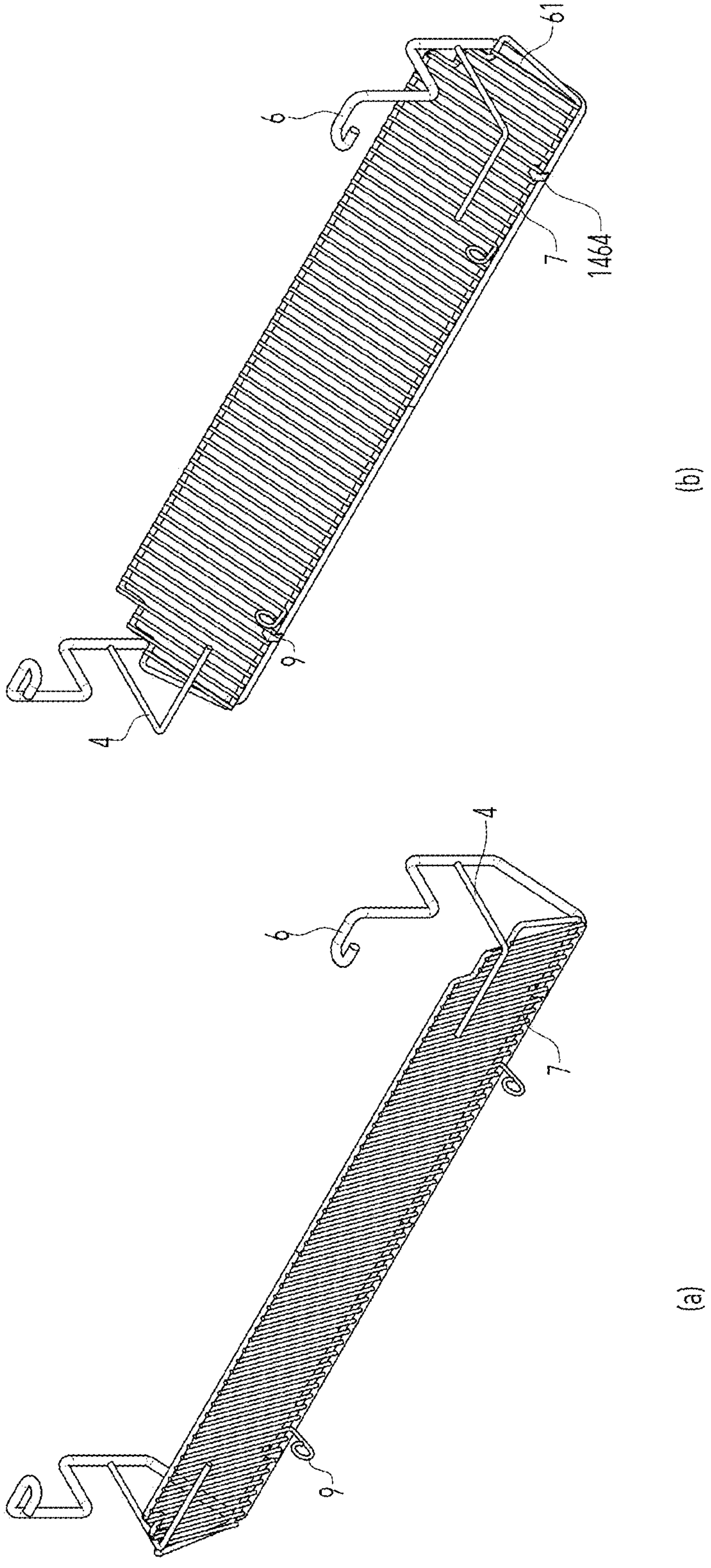
FIG. 6 is a diagram describing rotation of a rake by a hinge structure of FIG. 4.
Figure 7:
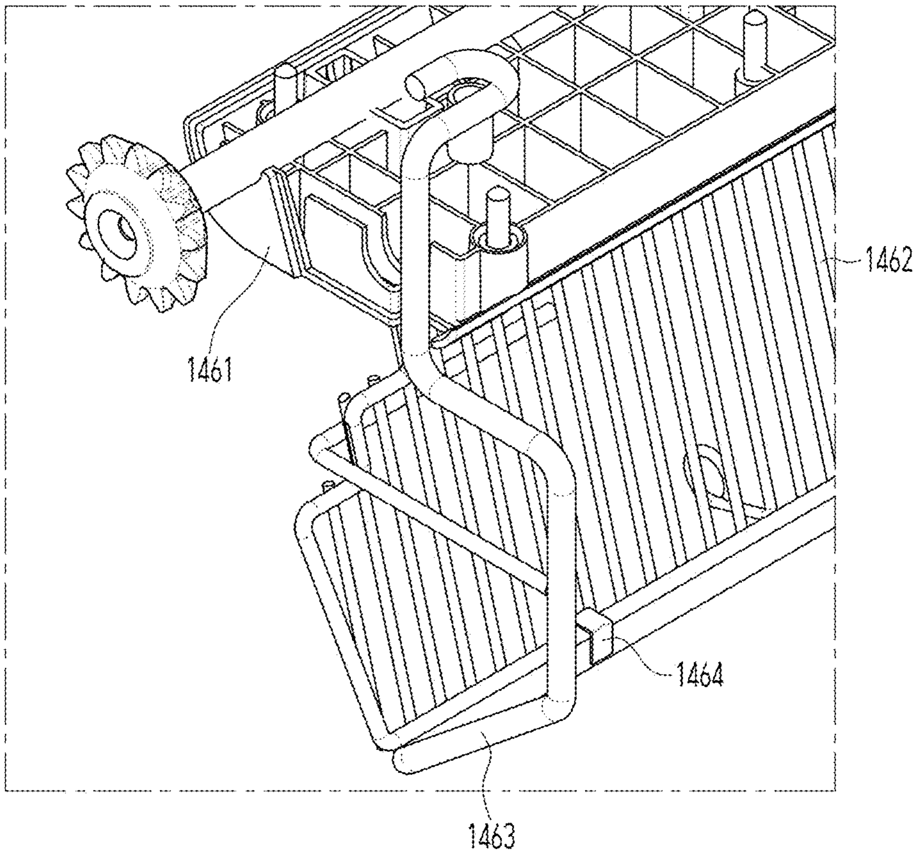
FIG. 7 is a diagram describing coupling of a scooper body and the rake of FIG. 4.

The structure and the coupling of the scooper 146 may be described in detail through FIGS. 6 and 7.

FIG. 6 is a diagram describing rotation of a rake by a hinge structure of FIG. 4, and FIG. 7 is a diagram describing coupling of a scooper body and the rake of FIG. 4.

Referring to FIGS. 6 and 7, the scooper 146 may operate in a scooping mode for removing a waste, and a return mode of returning to an initial position after removing the waste. In the case of the scooping mode, the scooper 146 moves in a direction from an entrance of the housing 110 to the collection box 150 (a→b direction of FIG. 2), and at this time, the step portion 8 is caught on the catching coupling portion 4 while the rake portion 1462 hinge-rotates in an entrance direction by gravity of sand in the bowel movement box 120 to become the same state as (a) of FIG. 5. The state of (a) of FIG. 5 becomes a state in which the scooper 146 is erected with respect to the body 1461. In the case of the return mode, the scooper 146 moves in a direction from the collection box 150 to the entrance of the housing 110 (c→d direction of FIG. 2), and even at this time, the step portion 8 is caught between the slope portion 61 of the side frame 6 and the bent extension portion 62 while the rake portion 1462 hinge-rotates in the direction of the collection box 150 by the gravity of the sand in the bowel movement box 120 to become the same state as (b) of FIG. 5.

Figure 8:
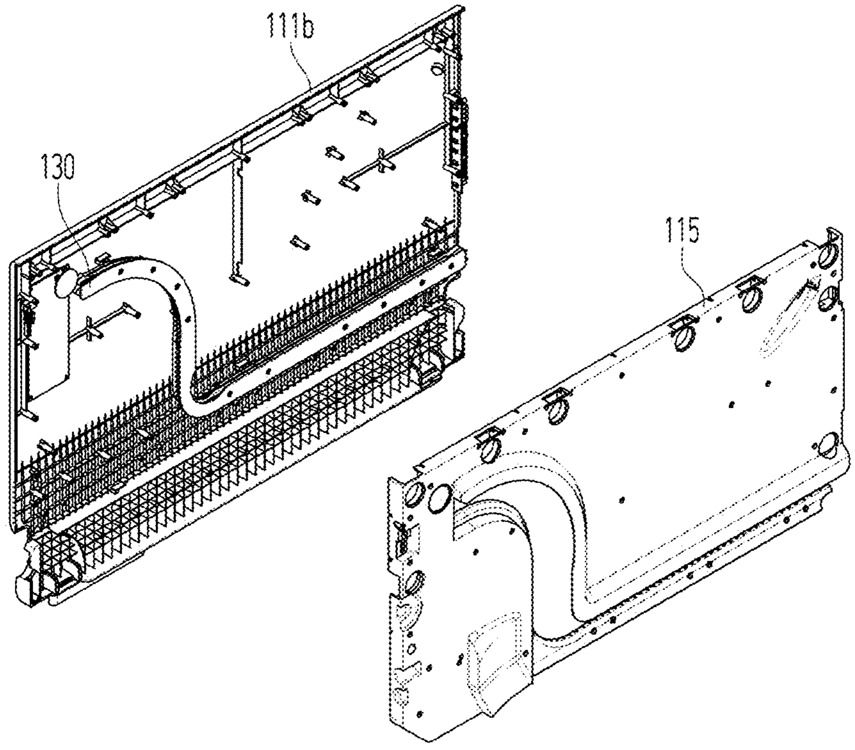
FIG. 8 is a perspective view illustrating a side portion of FIG. 1.

FIG. 8 is a perspective view illustrating a side portion of FIG. 1.

Referring to FIG. 8, the frame 115 may have a through-hole through which the rail 130 coupled to the side surface 111*b* may pass, and a path when the gear portion 145 which goes via the rail 130.

Figure 9:
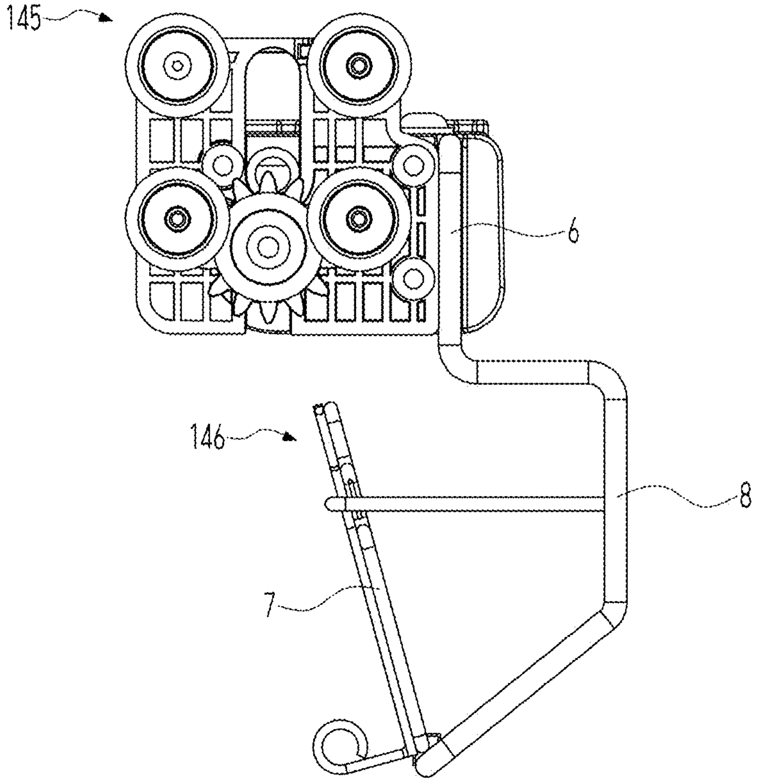
FIG. 9 is a diagram describing a scooping mode of a scooper according to an embodiment of the present disclosure.
Figure 10:
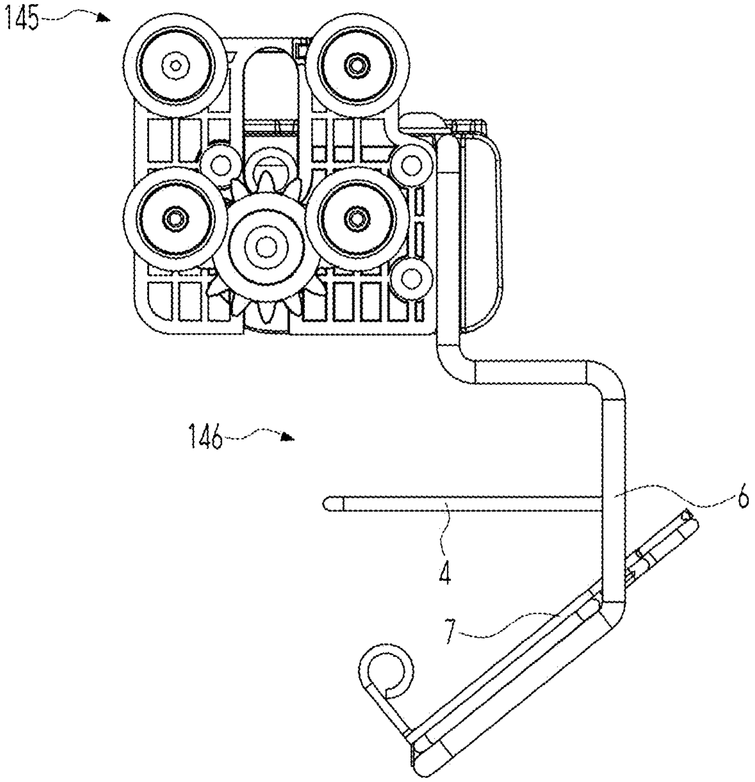
FIG. 10 is a diagram describing a return mode of the scooper according to an embodiment of the present disclosure.

FIG. 9 is a diagram describing a scooping mode of a scooper according to an embodiment of the present disclosure, and FIG. 10 is a diagram describing a return mode of the scooper according to an embodiment of the present disclosure.

Figure 11:
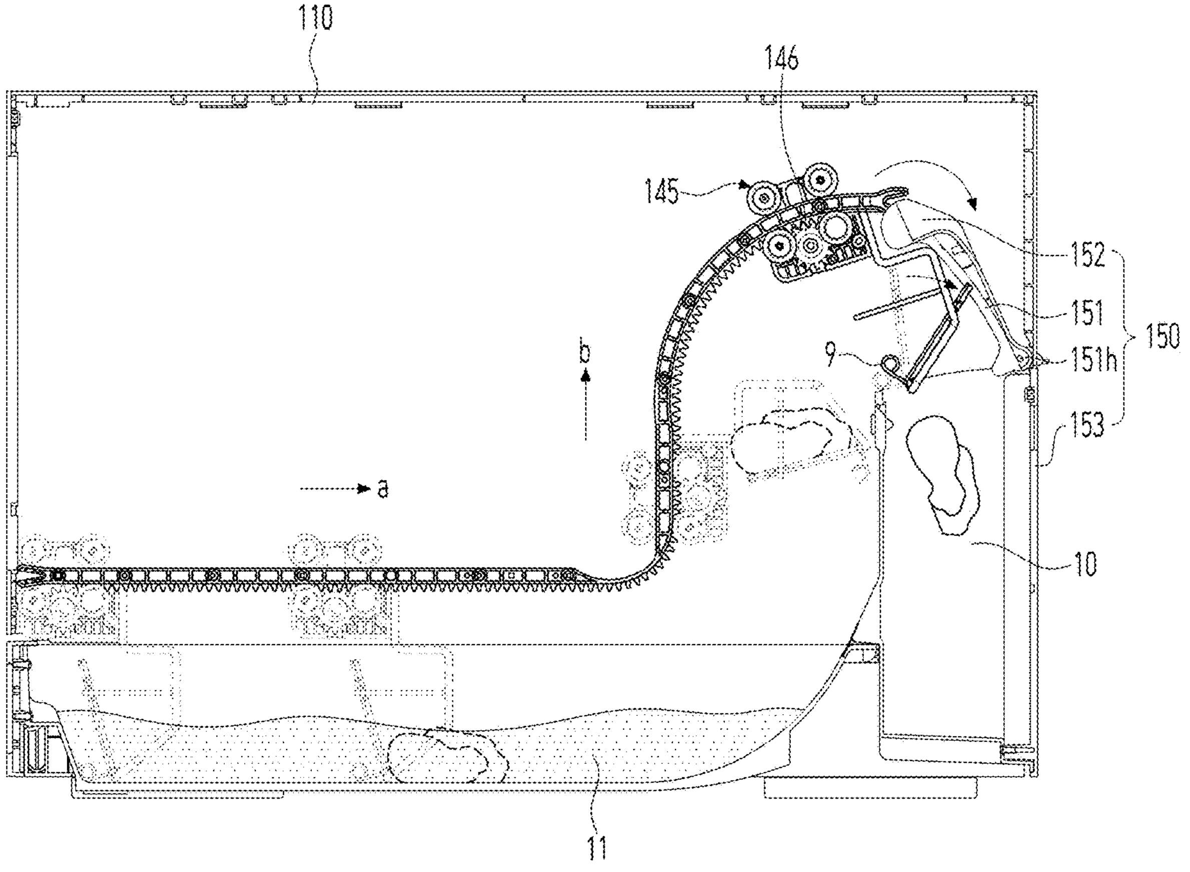
FIG. 11 is a diagram describing an embodiment of a waste scooping operation of the waste collection device according to the present disclosure.
Figure 12:
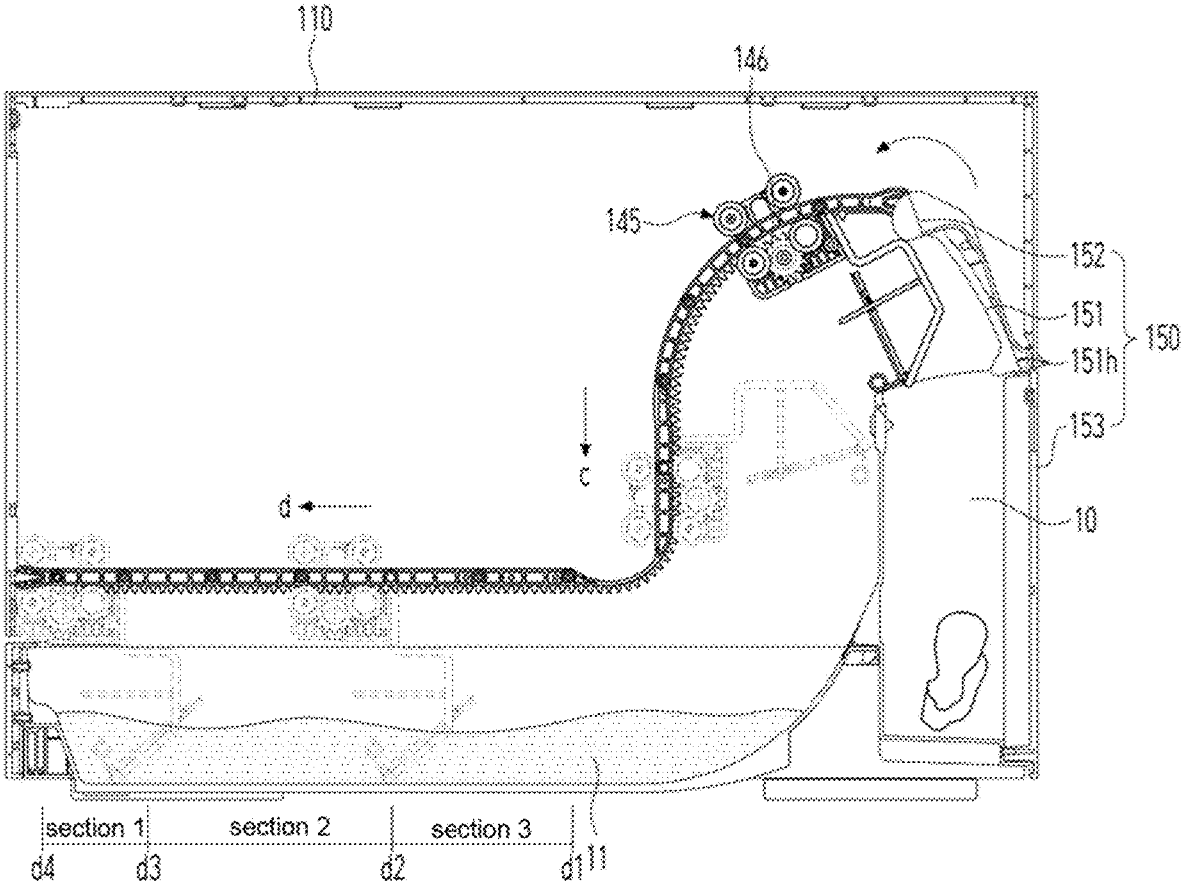
FIG. 12 is a diagram describing an embodiment of an initial position return operation of the waste collection device according to the present disclosure.

Further, a scooping operation when collecting the waste and a return operation when returning according to the scooping mode of FIG. 9 and the return mode of FIG. 10 may be described as in FIGS. 11 and 12.

First, referring to FIGS. 9 and 12, the scooping operation in which the scooper 146 moves in a vertical forward direction b along a horizontal forward direction a from the initial position, and scoops a waste is described.

The scooping mode may become an initial mode at the initial position (a front line of the bowel movement box at a start end of the rail), and may become a mode in which the scooper 146 may collect a waste 10 when the roller 141 and the gear 142 of the gear portion 145 go via the rail 130.

Specifically, the scooper 146 may move in the horizontal forward direction (a of FIG. 2) from the initial position. At this time, force is applied to the rake portion 1462 in a horizontal reverse direction by the gravity of the sand in the bowel movement box 120, so the rake portion 1462 rotates (counterclockwise) by the hinge member 1464 around the coupling bar 5, and catching-coupled to the catching coupling portion 8 to maintain the scooping mode (FIG. 9). At this time, the scooper 146 moves in the horizontal forward direction (a of FIG. 2) while the rake portion 1462 is erected at a specific angle with respect to the floor of the bowel movement box 120.

Further, the scooper 146 may continuously move in the vertical forward direction (b of FIG. 2) along the rail while collecting the waste 10 when moving the horizontal forward direction. At this time, the scooper 146 does not move as the rake portion 1462 is stably catching-coupled to the catching coupling portion 4 by the gravity, and moves in the vertical forward direction (b of FIG. 2) while maintaining the scooping mode 9.

Further, when the scooper 146 moves in the vertical forward direction (b of FIG. 2) and reaches a scooping completion position, that is, while the scooper 146 pushes and lifts the cover of the collection box 150, the rake portion 1462 rotates toward the inside of the collection box 150 to pass the waste to the collection box 150 while the tilting control member 9 presses an upper end of the collection box 150.

Consequently, when the scooper 146 moves to the vertical forward direction b from the horizontal forward direction a, the scooper 146 may scoop the waste 10 and move the waste 10 to the collection box 150 in the scooping mode (FIG. 9).

Next, referring to FIGS. 10 and 12, the return operation is described in which the scooper 146 moves to the horizontal reverse direction d along the vertical reverse direction c from a scooping completion position (rail end).

The return mode may become a mode in which the rake portion 1462 of the scooper 146 is laid down and moved in the return operation to the initial position to prevent sand 11 loaded on the bowel movement box 120 from being moved by the rake portion 1462 of the scooper 146.

Specifically, the scooper 146 moves in the vertical reverse direction c along the rail from the scooping completion position, and then moves in the horizontal reverse direction d. That is, at the time when the vertical reverse direction c is switched to the horizontal reverse direction d, force is applied to the rake portion 1462 in the horizontal forward direction by the gravity of the sand in the bowel movement box 120, so the rake portion 1462 rotates (clockwise) by the hinge member 1464 around the coupling bar 5, and an end **7*a* is coupled between the slope portion 61 of the slope portion 61, and the bent extension portion 62 to maintain the return mode (FIG. 10). At this time, the scooper 146 moves in the horizontal reverse direction (d of FIG. 2) and returns to the initial position while the rake portion 1462 is laid down at a specific angle with respect to the floor of the bowel movement box 120 along the slope portion 61. While moving in the horizontal reverse direction d, the scooper 146 may perform a rearrangement task that flattens the sand in addition to not dragging the sand to the initial position. In an embodiment, a movement section in the horizontal reverse direction d is divided into a plurality of sections (e.g., section 1, section, 2 and section 3), and forward movement and backward movement of the rake portion 1462 are repeatedly performed N (the N is a natural number) times for each section through motor control of the gear portion 145 to perform a sand rearrangement operation. For example, as the rake portion 1462 moves forward from point d1 to point d2 while being laid down at a specific angle by the sand gravity, and then moves backward while being erected at a specific angle while returning from point d2 to point d1 again repeatedly, sand which is present in a section between d1 and d2 may be rearranged to be flat. Thereafter, the rake portion 1462 may move from point d2 to point d3, and then perform the sand rearrangement operation similarly with respect to a section between d2 and d3**.

Therefore, when the rake portion 1462 moves in the horizontal reverse direction, even though there is sand or waste loaded on the bowel movement box 120, the rake portion 1462 does not interfere with the sand or waste, so the sand or waste is not moved to the initial position and is not accumulated.

In the present disclosure, the rake portion 1462 hinge-rotates through the gravity, and frictional force with the sand, so the scooping mode and the return mode may be mutually switched.

Figure 13:
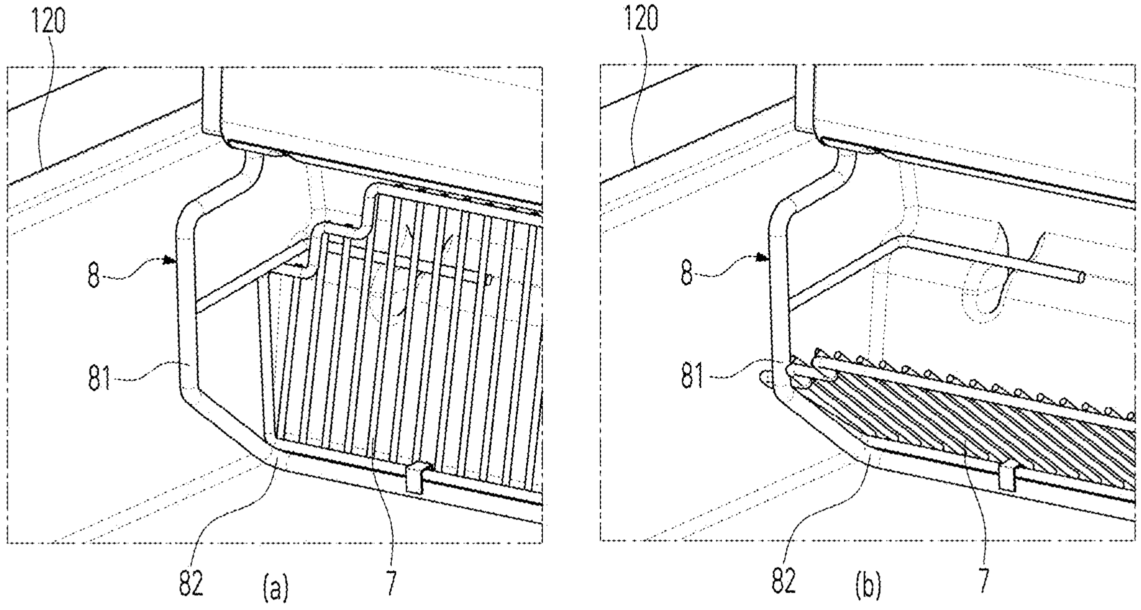
FIG. 13 is a diagram for describing a scooper which returns to an initial position according to an embodiment of the present disclosure.

FIG. 13 is a diagram for describing a scooper which returns to an initial position according to an embodiment of the present disclosure.

Referring to FIG. 13, it can be seen that the scooper 146 returns to the initial position when the catching coupling portion 6 is in contact with the bowel movement box 120 during a return process as in (b) of FIG. 13. It can be seen that during the return process to the initial position, the scooper 146 returns while the rake portion 1462 is seated on the slope portion 61 of the side frame 6, and is laid down.

Further, in FIG. 1, the collection box 150 may be provided at rear bottoms of the first side surface **111*a* and the second side surface 111*b*, and provided in a detachable form. At this time, an internal space of a top of the collection box 150 may extend by a frame connecting rear tops of the first side surface 111*a* and the second side surface 111*b***.

The collection box 150 may include the collection container 153 formed at a rear bottom, and the cover 151 which is hinge (**151*h*)-coupled may be formed on a top of the collection container 153, and an end of the cover 151 partially extends downward along a side of the collection container 153 to close the collection container 153**.

The collection container 153 may have a closing space accommodating the waste by the cover 151. At this time, when an operation of collecting the waste is not performed, the cover 151 closes the collection box 150, and when the operation of collecting the waste is performed, the scooper 146 may be formed in a structure of opening the cover 151 by pushing and lifting an end bent portion 152 of the cover 151.

Meanwhile, when the scooper 146 performs the return operation to the initial position, the end bent portion 152 is supported on the scooper 146, and moves down, so the cover 151 may close the collection box 150.

Further, an envelope fixation unit (not illustrated) such as a clip, a catching jaw, etc., which may put and fix a collection envelope, is provided in the collection container 153, so when the waste is collected by the collection envelope, the waste may also be removed by replacing only the collection envelope.

Further, for replacement of the bowel movement sand and discharge processing of the waste, the bowel movement box 120 and the collection container 153 may be provided in the detachable form, and a support fixation unit may be provided at a lower portion of the housing 110 so as to support and fix the bowel movement box 120 and the collection container 153 upon mounting.

Further, a space is provided at an upper portion of the collection box 150, and a power supply unit (not illustrated) may also be provided, and the power supply unit may also be provided as a replaceable battery or a chargeable or dischargeable battery.

The pet waste collection device according to the present disclosure has an internal space in which a pet may defecate, and can scoop and discharge waste while moving along a rail when the waste is generated, and is laid and moved to prevent sand in the internal space from being accumulated at an initial position when returning to the initial position.

The present disclosure has been described with reference to the preferred embodiments of the present disclosure, but those skilled in the art will understand that the present disclosure can be variously modified and changed without departing from the spirit and the scope of the present disclosure which are defined in the appended claims.

| [Detailed Description of Main Elements] |
| --- |
| 100: Pet waste collection device |
| 110: Housing |
| 111a, 111b: Side surface |
| 112: Front surface |
| 113: Top surface |
| 115: Frame |
| 120: Bowel movement box |
| 130: Rail |
| 140: Collection unit |
| 145: Gear portion |
| 141: Roller |
| 142: Gear (pinion gear) |
| 143: Gear box |
| 146: Scooper |
| 1461: Body |
| 1: Upper case |
| 2: Lower case |
| 3: Side case |
| 1462: Rake portion |
| 7: Plurality of rakes |
| 8: Step portion |
| 9: Tilting control member |
| 1463: Coupling portion |
| 4: Catching coupling portion |
| 5: Coupling bar |
| 6: Side frame |
| 61: Slope portion |
| 61: Slope portion |
| 62: Bent extension portion |
| 63: End portion |
| 1464: Hinge member |
| 150: Collection box |
| 151: Cover |
| 151h: Hinge portion |
| 152: End bent portion |
| 153: Collection container |
| 10: Waste |
| 11: Bowel movement sand |

The invention claimed is:

1. A pet waste collection device comprising:

a housing forming an internal space and having at least one opening for entrance of a pet;

a bowel movement box configured to be disposed at a lower portion of the internal space, and loaded with bowel movement sand;

rails formed on inner surfaces of both facing side surfaces of the housing;

a collection unit including a gear portion moving along the rail, and a scooper coupled to the gear portion, scooping and transporting a waste mixed with the bowel movement sand of the bowel movement box, and rotating to be laid down toward a floor of the bowel movement box, and moved when returning to an initial position; and a collection box disposed in a rear space of the housing, and accommodating the waste, wherein the scooper includes:

a body, a rake portion disposed below the body and including a rake having a plurality of tines, a coupling portion configured to couple the body and the rake portion, and at least one hinge member configured to connect a bottom portion of the rake portion to the coupling portion, such that a top portion of the rake portion is movable forward or backward along an arcuate path while the bottom portion of the rake portion pivots, wherein the coupling portion includes side frames fixed to the body, the side frames respectively having catching coupling portions protruding therefrom and bent toward each other to receive and limit rotation of the rake portion, wherein each side frame further includes a slope portion and a bent extension portion, wherein the rake portion includes step portions formed at opposite sides of the top portion of the rake portion, wherein, during a forward movement of the gear portion along the rails, the rake portion is configured to pivot around the hinge member in a first direction due to interaction with the bowel movement sand such that the step portions physically engage the catching coupling portions and the rake portion is maintained in an erected scooping state relative to the floor of the bowel movement box, and wherein, during a backward movement of the gear portion along the rails, the rake portion is configured to pivot around the hinge member in a second direction opposite to the first direction due to gravity and interaction with the bowel movement sand such that the step portions are released from the catching coupling portions and received between the slope portions and the bent extension portions, such that the rake portion is maintained in a laid-down return state relative to the floor of the bowel movement box while reducing movement of the bowel movement sand toward the initial position.

2. The pet waste collection device of claim 1, wherein the rail includes a first linear portion forming a length, a first curvature portion, which extends from the first linear portion, forming a first curvature upwards in the internal space, a second linear portion, which extends from the first curvature portion, and a second curvature portion, which extends from the second linear portion, forming a second curvature larger than the first curvature rearward in the internal space, and guides a movement path so that the scooper moves by scooping the waste loaded on the bowel movement box.

3. The pet waste collection device of claim 1, wherein the rake portion includes tilting control members which are spaced apart from each other by a specific distance, and protrude at the bottom portion, and hinge-rotate the rake portion by contacting a top of the collection box to control a slope in a direction of the collection box.

4. The pet waste collection device of claim 1, wherein the scooper is configured to perform a rearrangement task which flattens sand by dividing a section, and repeatedly performing forward movement and backward movement N (the N is a natural number) times through motor control of the gear portion for each section, while horizontally moving in the laid-down return state.

5. The pet waste collection device of claim 1, wherein the scooper pushes and lifts an end bent portion of a cover of the collection box to open the cover when transporting the waste, and moves down while supporting the end bent portion of the cover to allow the cover to close the collection box.

* * * * *